(12) United States Patent
Han et al.

(10) Patent No.: US 10,526,679 B2
(45) Date of Patent: *Jan. 7, 2020

(54) METHOD FOR MANUFACTURING A HOT DIP GALVANIZED AND GALVANNEALED STEEL SHEET HAVING EXCELLENT ELONGATION PROPERTIES

(71) Applicant: POSCO, Pohang-si, Gyeongsangbuk-do (KR)

(72) Inventors: Sang Ho Han, Gwangyang-si (KR); Seong Ho Han, Gwangyang-si (KR)

(73) Assignee: POSCO, Pohang-si, Gyeongsangbuk-Do (KR)

( * ) Notice: Subject to any disclaimer, the term of this patent is extended or adjusted under 35 U.S.C. 154(b) by 212 days.

This patent is subject to a terminal disclaimer.

(21) Appl. No.: 15/622,794

(22) Filed: Jun. 14, 2017

(65) Prior Publication Data
US 2017/0283902 A1    Oct. 5, 2017

Related U.S. Application Data

(62) Division of application No. 14/757,453, filed on Dec. 23, 2015, now Pat. No. 9,708,684.

(30) Foreign Application Priority Data

Dec. 24, 2014    (KR) .................... 10-2014-0187935

(51) Int. Cl.
*C23C 30/00* (2006.01)
*C21D 9/46* (2006.01)
(Continued)

(52) U.S. Cl.
CPC .............. *C21D 9/46* (2013.01); *B32B 15/012* (2013.01); *B32B 15/013* (2013.01);
(Continued)

(58) Field of Classification Search
CPC ......... C22C 38/32; C22C 38/22; C22C 38/06; C22C 38/04; C22C 38/02; C22C 38/002;
(Continued)

(56) References Cited

U.S. PATENT DOCUMENTS 9,708,684 B2 *   7/2017   Han .................... C22C 38/18
2003/0129444 A1   7/2003   Matsuoka et al.
(Continued)

FOREIGN PATENT DOCUMENTS

JP    2004-292891    * 10/2004 ............... C21D 9/46
JP    2004-292891 A    10/2004
(Continued)

OTHER PUBLICATIONS

Korean Office Action dated Jan. 15, 2016 issued in Korean Patent Application No. 10-2014-0187935 (with English translation).
(Continued)

*Primary Examiner* — Patricia L. Hailey
(74) *Attorney, Agent, or Firm* — Morgan, Lewis & Bockius LLP

(57) ABSTRACT

There is provided a hot-dip galvanized steel sheet and a hot-dip galvannealed steel sheet, which have excellent elongation properties, and methods for manufacturing the hot-dip galvanized steel sheet and the hot-dip galvannealed steel sheet. The present disclosure relates to a hot-dip galvanized steel sheet in which a hot-dip galvanized layer is formed on a surface of abase steel sheet, the hot-dip galvanized steel sheet having excellent elongation properties and being characterized by the composition and the microstructure thereof.

3 Claims, 2 Drawing Sheets

(51) Int. Cl.

| | |
|---|---|
| C22C 38/38 | (2006.01) |
| C22C 38/32 | (2006.01) |
| C22C 38/22 | (2006.01) |
| C22C 38/06 | (2006.01) |
| C22C 38/04 | (2006.01) |
| C22C 38/02 | (2006.01) |
| C22C 38/00 | (2006.01) |
| C21D 6/00 | (2006.01) |
| C21D 1/26 | (2006.01) |
| C23C 2/06 | (2006.01) |
| C23C 2/02 | (2006.01) |
| C21D 8/02 | (2006.01) |
| C23C 2/04 | (2006.01) |
| C22C 38/18 | (2006.01) |
| C23C 2/28 | (2006.01) |
| C23C 2/12 | (2006.01) |
| C23C 28/02 | (2006.01) |
| B32B 15/01 | (2006.01) |
| B32B 15/04 | (2006.01) |
| B32B 15/18 | (2006.01) |

(52) U.S. Cl.
CPC ............ *B32B 15/017* (2013.01); *B32B 15/04* (2013.01); *B32B 15/043* (2013.01); *B32B 15/18* (2013.01); *C21D 1/26* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0278* (2013.01); *C22C 38/001* (2013.01); *C22C 38/002* (2013.01); *C22C 38/02* (2013.01); *C22C 38/04* (2013.01); *C22C 38/06* (2013.01); *C22C 38/18* (2013.01); *C22C 38/22* (2013.01); *C22C 38/32* (2013.01); *C22C 38/38* (2013.01); *C23C 2/02* (2013.01); *C23C 2/04* (2013.01); *C23C 2/06* (2013.01); *C23C 2/12* (2013.01); *C23C 2/28* (2013.01); *C23C 2/285* (2013.01); *C23C 28/021* (2013.01); *C23C 28/023* (2013.01); *C23C 30/00* (2013.01); *C23C 30/005* (2013.01); *Y10T 428/12757* (2015.01); *Y10T 428/12792* (2015.01); *Y10T 428/12972* (2015.01)

(58) Field of Classification Search
CPC ....... C22C 38/001; C22C 38/38; C22C 38/18; C23C 2/06; C23C 2/02; C23C 2/04; C23C 2/12; C23C 2/28; C23C 2/285; C23C 8/021; C23C 8/023; C23C 30/00; C23C 38/005; B32B 15/012; B32B 15/017; B32B 15/013; B32B 15/04; B32B 15/043; B32B 15/18; Y10T 428/12792; Y10T 428/15757; Y10T 428/12972
See application file for complete search history.

(56) References Cited

U.S. PATENT DOCUMENTS

| | | | |
|---|---|---|---|
| 2006/0222882 A1* | 10/2006 | Honda | B32B 15/013 428/659 |
| 2008/0149230 A1* | 6/2008 | Yoon | C21D 8/02 148/603 |
| 2012/0305144 A1 | 12/2012 | Okamoto et al. | |
| 2013/0071687 A1* | 3/2013 | Takagi | C21D 8/0226 428/659 |
| 2013/0292010 A1 | 11/2013 | Kimura et al. | |
| 2014/0193667 A1 | 7/2014 | Shuto et al. | |
| 2014/0377582 A1* | 12/2014 | Azuma | C23C 2/02 428/632 |
| 2016/0186285 A1* | 6/2016 | Kim | C21D 8/02 148/603 |
| 2016/0340755 A1* | 11/2016 | Han | C23C 2/06 |
| 2017/0260602 A1* | 9/2017 | An | B32B 15/013 |

FOREIGN PATENT DOCUMENTS

| | | | | |
|---|---|---|---|---|
| JP | 2005-264176 | * | 9/2005 | ............ B21B 45/02 |
| JP | 2005-264176 A | | 9/2005 | |
| KR | 2002-0073564 A | | 9/2002 | |
| KR | 10-2012-0107003 A | | 9/2012 | |
| KR | 10-2014-0027526 A | | 3/2014 | |

OTHER PUBLICATIONS

U.S. Notice of Allowance dated Apr. 11, 2017 issued in U.S. Appl. No. 14/757,453.
U.S. Office Action dated Dec. 21, 2016 issued in U.S. Appl. No. 14/757,453.

* cited by examiner

METHOD FOR MANUFACTURING A HOT DIP GALVANIZED AND GALVANNEALED STEEL SHEET HAVING EXCELLENT ELONGATION PROPERTIES

CROSS-REFERENCE TO RELATED APPLICATION

This a divisional patent application of U.S. patent application Ser. No. 14/757,453, filed Dec. 23, 2015 which in turn claims the benefit of Korean Patent Application No. 10-2014-0187935 filed on Dec. 24, 2014, the disclosures of which are incorporated herein by reference.

BACKGROUND

The present disclosure relates to a high-strength steel sheet, and more particularly, to a hot-dip galvanized steel sheet and a hot-dip galvannealed steel sheet, applicable to automotive body panels, and the like, due to possessing excellent formability, and methods for manufacturing the hot-dip galvanized steel sheet and the hot-dip galvannealed steel sheet.

With a focus on crashworthiness regulations and fuel efficiency in vehicles, high-strength steels are being actively used in automotive applications in order to achieve requirements for high strength, together with reductions in the weight of automotive bodies, and, in line with these trends, high-strength steels are being applied to automotive body panels. Currently, a 340 MPa grade bake hardening steel is generally used for automotive body panels. However, 490 MPa grade bake hardening steel is also being used in some applications, while the application of 590 MPa grade bake hardening steel is further expected in the future.

While the use of such bake hardening steel sheets for body panels allows for weight reductions, and improves impact resistance, the use of such steel sheets may be disadvantageous, in that formability decreases as strength increases. Thus, recently, customers have demanded steel sheets having a low yield ratio (YR=YS/TS) and excellent ductility in order to compensate for insufficient workability in high-strength steel sheets applied to automotive body panels. Furthermore, above all, steel sheets used for automotive body panels should have excellent surface qualities. However, it may be difficult to ensure desired surface qualities in plated steel sheets due to hardenability-imparting and easily oxidizable elements (e.g., Si, Mn etc.), which are added to obtain high strength.

On the other hand, excellent corrosion resistance is required for the proper use of such steel sheets in automotive applications, and hot-dip galvanized steel sheets having excellent corrosion resistance have thus been conventionally used as steel sheets for automotive applications. These steel sheets are manufactured through continuous hot-dip galvanizing equipment in which recrystallization annealing and plating are performed on the same line, and thus have an advantage in that highly corrosion resistant steel sheets may be manufactured at low cost. Furthermore, hot-dip galvannealed steel sheets, which are obtained through hot-dip galvanizing and reheating thereafter, are being widely implemented due to excellent weldability or formability in addition to excellent corrosion resistance.

Therefore, in order to reduce the weight of and increase the workability of automotive body panels, the development of a high-strength cold-rolled steel sheet having excellent formability is required, and in addition thereto, the development of a high-strength hot-dip galvanized steel sheet having excellent corrosion resistance, weldability, and formability is also required.

As prior art in which workability of such a high-strength steel sheet is improved, patent document 1 discloses a multi-phase steel sheet including martensite as a main component, and suggests a method for manufacturing a high-strength steel sheet in which fine Cu precipitates having particle diameters of 1-100 nm are dispersed in the structure to improve workability. However, according to the disclosure of patent document 1, it is necessary to add an excess amount of Cu, e.g., 2-5% of Cu, in order to precipitate fine Cu particles so that red shortness caused by Cu may occur, and manufacturing costs may be excessively increased.

Patent document 2 discloses a multi-phase steel sheet including ferrite as a primary phase, retained austenite as a secondary phase, and bainite and martensite, which are low-temperature transformed phases, and a method for improving the ductility and stretch-flangeability of the steel sheet. However, according to the disclosure of patent document 2, large amounts of Si and Al are added to obtain the retained austenite phase, and therefore it is difficult to ensure plating quality and surface qualities in steelmaking and continuous casting. In addition, there is a disadvantage in that the initial YS value is high due to transformation induced plasticity, and thus the yield ratio is high.

Patent document 3, which relates to a feature for providing a high-strength hot-dip galvanized steel sheet exhibiting good workability, discloses a steel sheet having a microstructure including a composite of relatively soft ferrite and relatively hard martensite, and a manufacturing method for improving the elongation and Lankford value (R-value) of the steel sheet. According to this feature, however, a large amount of Si is added, and thus it is difficult to obtain excellent plating quality, and manufacturing costs are increased due to the addition of large amounts of Ti and Mo.

RELATED ART DOCUMENTS (Patent Document 1) JP Patent Application Laid-open Publication No. 2005-264176

(Patent Document 2) JP Patent Application Laid-open Publication No. 2004-292891

(Patent Document 3) KR Patent Application Laid-open Publication No. 2002-0073564

SUMMARY

An aspect of the present disclosure may provide a hot-dip galvanized steel sheet and a hot-dip galvannealed steel sheet, which are suitable for automotive body panels, and in which a design of an alloy and manufacturing conditions are optimized to achieve a tensile strength of 450-650 MPa and to exhibit excellent low yield ratio (YS/TS) properties, and particularly, to allow for significantly improved ductility against the yield ratio.

An aspect of the present disclosure may also provide methods for manufacturing the hot-dip galvanized steel sheet and the hot-dip galvannealed steel sheet.

However, the embodiments of the present disclosure are not limited thereto, and other technical embodiments not mentioned herein would be clearly understood by a person skilled in the art from the description below.

According to an aspect of the present disclosure, there is provided a hot-dip galvanized steel sheet in which a hot-dip galvanized layer is formed on a surface of a base steel sheet, the hot-dip galvanized steel sheet having excellent elongation properties, wherein the base steel sheet:

contains 0.02-0.08% of carbon (C), 1.3-2.1% of manganese (Mn), 0.3% or less of silicon (Si) (excluding 0%), 1.0% or less of chromium (Cr) (excluding 0%), 0.1% or less of phosphorous (P) (excluding 0%), 0.01% or less of sulfur (S) (excluding 0%), 0.01% or less of nitrogen (N) (excluding 0%), 0.02-0.06% of aluminum (sol. Al), 0.2% or less of molybdenum (Mo) (excluding 0%), 0.003% or less of boron (B) (excluding 0%), and a remainder of Fe and other inevitable impurities, in wt %;

has a microstructure including 90% or more of ferrite, and a remainder of martensite and 3% or less of bainite, as defined by Equation 1;

contains a percentage of martensite (M %) having an average particle diameter of 5 μm or less occupying space in ferrite grain boundaries (including grain boundary triple points) of 90% or higher, as defined by Equation 2; and at ¼t based on the thickness (t) of the sheet, the ratio of a C concentration (a) in the ferrite phase to a C concentration (b) in the martensite phase, i.e., (a)/(b), is 0.7 or less, and the ratio of an Mn concentration (c) in the ferrite phase to an Mn concentration (d) in the martensite phase, i.e., (c)/(d), is 0.8 or less.

$$B(\%) = \{BA/(MA+BA)\} \times 100 \quad \text{[Equation 1]}$$

where BA is the area occupied by bainite, and MA is the area occupied by martensite.

$$M(\%) = \{M_{gb}/(M_{gb}+M_{in})\} \times 100 \quad \text{[Equation 2]}$$

where $M_{gb}$ is the amount of martensite at ferrite grain boundaries, and $M_{in}$ is the amount of martensite within ferrite grains, the martensite having an average particle diameter of 5 μm or less.

In the base steel sheet, the ferrite phase may have an average grain size of 4 μm or greater, and the area occupied by the ferrite phase having an average grain size of 7 μm or greater in the entire ferrite phase may be 10% or higher.

According to another aspect of the present disclosure, there is provided a hot-dip galvannealed steel sheet in which a hot-dip galvannealed layer is formed on a surface of a base steel sheet, the hot-dip galvannealed steel sheet having excellent elongation properties, wherein the base steel sheet:

contains 0.02-0.08% of carbon (C), 1.3-2.1% of manganese (Mn), 0.3% or less of silicon (Si) (excluding 0%), 1.0% or less of chromium (Cr) (excluding 0%), 0.1% or less of phosphorous (P) (excluding 0%), 0.01% or less of sulfur (S) (excluding 0%), 0.01% or less of nitrogen (N) (excluding 0%), 0.02-0.06% of aluminum (sol. Al), 0.2% or less of molybdenum (Mo) (excluding 0%), 0.003% or less of boron (B) (excluding 0%), and a remainder of Fe and other inevitable impurities, in wt %;

has a microstructure including 90% or more of ferrite, and a remainder of martensite and 3% or less of bainite, as defined by Equation 1;

contains a percentage of martensite (M %) having an average particle diameter of 5 μm or less occupying space in ferrite grain boundaries (including grain boundary triple points) of 90% or higher, as defined by Equation 2; and at ¼t based on the thickness (t) of the sheet, the ratio of a C concentration (a) in the ferrite phase to a C concentration (b) in the martensite phase, i.e., (a)/(b), is 0.7 or less, and the ratio of an Mn concentration (c) in the ferrite phase to an Mn concentration (d) in the martensite phase, i.e., (c)/(d), is 0.8 or less.

In the base steel sheet, the ferrite phase may have an average grain size of 4 μm or greater, and the area occupied by the ferrite phase having an average grain size of 7 μm or greater in the entire ferrite phase may be 10% or higher.

According to another aspect of the present disclosure, there is provided a method for manufacturing a hot-dip galvanized steel sheet having excellent elongation properties, the method including:

preparing a steel slab having the above-described compositional components, and thereafter reheating the steel slab;

performing finish hot-rolling on the reheated steel slab in a temperature range of Ar3+50° C.-950° C., and thereafter coiling the finish hot-rolled steel sheet at 450-700° C.;

performing cold-rolling on the coiled hot-rolled steel sheet with a reduction ratio of 40-80%, and thereafter performing continuous annealing on the cold-rolled steel sheet in a temperature range of 760-850° C.;

performing a first cooling on the continuous annealed steel sheet to a temperature range of 630-670° C. at an average cooling rate of 2-8° C./s, and thereafter performing a second cooling on the first cooled steel sheet to a temperature range of Ms+20° C. to Ms+50° C. at an average cooling rate of 3-10° C./s; and performing hot-dip galvanizing on the second cooled steel sheet in a temperature range of 440-480° C., and thereafter cooling the hot-dip galvanized steel sheet to a temperature of Ms−100° C. or lower at an average cooling rate of 4° C./s or higher.

In the base steel sheet of the hot-dip galvanized steel sheet, the microstructure may include 90% or more of ferrite, and a remainder of martensite and 3% or less of bainite, as defined by Equation 1;

the percentage of martensite (M %) having an average particle diameter of 5 μm or less occupying space in ferrite grain boundaries (including grain boundary triple points) may be 90% or higher, as defined by Equation 2; and at ¼t based on the thickness (t) of the sheet, the ratio of a C concentration (a) in the ferrite phase to a C concentration (b) in the martensite phase, i.e., (a)/(b), may be 0.7 or less, and the ratio of an Mn concentration (c) in the ferrite phase to an Mn concentration (d) in the martensite phase, i.e., (c)/(d), may be 0.8 or less.

In the base steel sheet of the hot-dip galvanized steel sheet, the ferrite phase may have an average grain size of 4 or greater, and the area occupied by the ferrite phase having an average grain size of 7 μm or greater in the entire ferrite phase may be 10% or higher.

According to another aspect of the present disclosure, there is provided a method for manufacturing a hot-dip galvannealed steel sheet having excellent elongation properties, the method including:

preparing a steel slab having the above-described compositional components, and thereafter reheating the steel slab;

performing finish hot-rolling on the reheated steel slab in a temperature range of Ar3+50° C.-950° C., and thereafter coiling the finish hot-rolled steel sheet at 450-700° C.;

performing cold-rolling on the coiled hot-rolled steel sheet with a reduction ratio of 40-80%, and thereafter performing continuous annealing in which the cold-rolled steel sheet is subjected to a second heating to a temperature range of 760–850° C. at an average heating rate of 2° C./s or less;

performing a first cooling on the continuous annealed steel sheet to a temperature range of 630-670° C. at an average cooling rate of 2-8° C./s, and thereafter performing a second cooling on the first cooled steel sheet to a temperature range of Ms+20° C. to Ms+50° C. at an average cooling rate of 3-10° C./s; and performing hot-dip galvanizing on the second cooled steel sheet in a temperature range of 440-480° C., and thereafter performing alloying heat treatment on the hot-dip galvanized steel sheet, and then cooling the alloying heat-treated steel sheet to a temperature of Ms−100° C. or lower at an average cooling rate of 4° C./s or higher.

In the base steel sheet of the hot-dip galvannealed steel sheet, the microstructure may include 90% or more of ferrite, and a remainder of martensite and 3% or less of bainite, as defined by Equation 1;

the percentage of martensite (M %) having an average particle diameter of 5 μm or less occupying space in ferrite grain boundaries (including grain boundary triple points) may be 90% or higher, as defined by Equation 2; and at ¼t based on the thickness (t) of the sheet, the ratio of a C concentration (a) in the ferrite phase to a C concentration (b) in the martensite phase, i.e., (a)/(b), may be 0.7 or less, and the ratio of an Mn concentration (c) in the ferrite phase to an Mn concentration (d) in the martensite phase, i.e., (c)/(d), may be 0.8 or less.

In the base steel sheet of the hot-dip galvannealed steel sheet, the ferrite phase may have an average grain size of 4 μm or greater, and the area occupied by the ferrite phase having an average grain size of 7 μm or greater in the entire ferrite phase may be 10% or higher.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
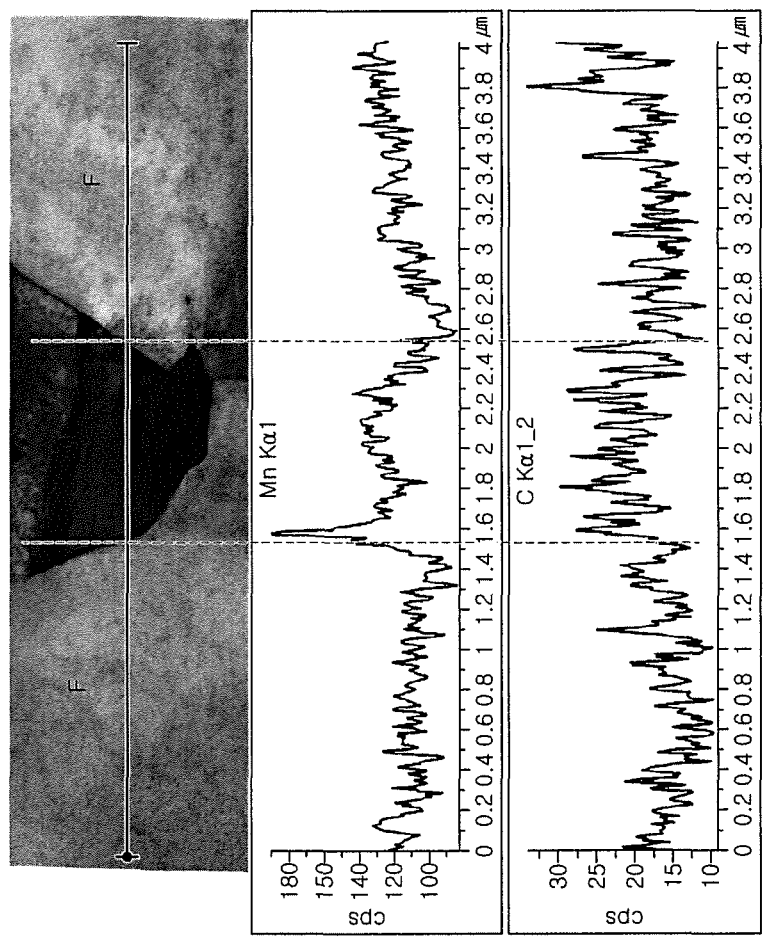
FIG. 1 is a graph showing concentration ratios of C and Mn in a ferrite phase and a martensite phase at ¼t based on the thickness (t) of abase steel sheet of a hot-dip galvanized steel sheet manufactured according to an embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

As a result of intensive investigation for providing a steel sheet which has both strength and ductility, and thus exhibits excellent formability to be suitable for automotive body panels, the present inventors found that a multi-phase steel sheet satisfying desired properties can be provided by optimizing manufacturing conditions together with alloy design, and finally achieved the present disclosure.

First, the hot-dip galvanized steel sheet and the hot-dip galvannealed steel sheet, which have excellent elongation properties, according to the present disclosure will be described in detail.

The hot-dip galvanized steel sheet according to the present disclosure contains 0.02-0.08% of carbon (C), 1.3-2.1% of manganese (Mn), 0.3% or less of silicon (Si) (excluding 0%), 1.0% or less of chromium (Cr) (excluding 0%), 0.1% or less of phosphorous (P) (excluding 0%), 0.01% or less of sulfur (S) (excluding 0%), 0.01% or less of nitrogen (N) (excluding 0%), 0.02-0.06% of acid-soluble aluminum (sol. Al), 0.2% or less of molybdenum (Mo) (excluding 0%), 0.003% or less of boron (B) (excluding 0%), and a remainder of Fe and other inevitable impurities, in wt %.

Hereinafter, reasons for limiting the alloying composition of the hot-dip galvanizing steel sheet according to the present disclosure as above will be described in detail. The content of each component refers to wt % unless otherwise specifically stated.

C: 0.02-0.08%

Carbon (C) is an important component in manufacturing a multi-phase steel sheet, and is a beneficial element in terms of strength by forming martensite, which is one of the dual-phase structures. In general, the higher C content facilitates the formation of martensite, and is thus advantageous in manufacturing a multi-phase steel. However, it is required that the C content is controlled at an appropriate level so as to control desired strength and yield ratio (YS/TS).

In particular, the higher C content tends to increase the yield ratio of steel because bainite transformation also occurs during cooling after annealing. In the present disclosure, it is important, if possible, to minimize bainite formation and form martensite at an appropriate level, thereby obtaining desired material properties.

Therefore, it is preferable that the C content is controlled to be 0.02% or more. When the C content is less than 0.02%, it is difficult to obtain 450 MPa grade strength aimed in the present disclosure and to form martensite at an appropriate level. Conversely, when the C content is more than 0.08%, the formation of inter-granular bainite is accelerated during cooling after annealing, thereby increasing yield strength and the yield ratio (YS/TS), so that bending and surface defects are prone to occur in the formation of automotive components. Therefore, in the present disclosure, it is preferable that the C content is controlled to be 0.02-0.08%, and more preferably, the C content is controlled to be 0.03-0.06% to obtain appropriate strength.

Mn: 1.3-2.1%

Manganese (Mn) is a hardenability improving element in a multi-phase steel sheet, and is an important element particularly in forming martensite. In conventional solid-solution strengthened steel, Mn is effective in improving strength due to the solid-solution strengthening effect, and precipitate S, which is inevitably added to steel, into MnS, thus playing an important role to suppress plate rupture and high temperature embrittlement, which are caused by S during hot rolling.

In the present disclosure, it is preferable that 1.3% or more of Mn is added. When the Mn content is less than 1.3%, martensite cannot be formed, so that it is difficult to manufacture a multi-phase steel. Conversely, when the Mn content is more than 2.1%, an excess amount of martensite is formed, thus causing material instability, and Mn-Band (Mn oxide band) is formed in the structure, so that the risk of work cracks and plate rupture is increased. Furthermore, Mn oxides are released to the surface during annealing, thereby significantly deteriorating coatability. Therefore, in the present disclosure, it is preferable that the Mn content is limited to 1.3-2.1%, and more preferably, the Mn content is limited to 1.4-1.8%.

Cr: 1.0% or less (excluding 0%)

Chromium (Cr) is a component having similar properties to the above-described Mn, and is added to improve hardenability and to obtain high strength in steel. Cr is effective in forming martensite, and forms coarse Cr carbides such as $Cr_{23}C_6$ during a hot rolling process, thereby precipitating C dissolved in steel below an appropriate level, and thus suppressing yield point elongation (YP-El). Therefore, Cr is a beneficial element in manufacturing a multi-phase steel having a low yield ratio. Furthermore, Cr minimizes a decrease in elongation against an increase in strength, and is also beneficial in manufacturing a multi-phase steel having high ductility.

In the present disclosure, the aforementioned Cr facilitates the formation of martensite through improving hardenability. However, when the Cr content is more than 1.0%, the fraction of forming martensite excessively increases, thereby causing decreases in strength and elongation.

Therefore, in the present disclosure, it is preferable that the Cr content is limited to 1.0% or less, excluding 0% in consideration of being inevitably added during manufacturing.

Si: 0.3% or less (excluding 0%)

In general, silicon (Si) is an element that forms retained austenite at an appropriate level during cooling after annealing, and thus significantly contributing to improving elongation. However, this is effective when the C content is high (e.g., about 0.6%). Furthermore, it is known that the aforementioned Si acts to improve the strength of steel through the solid-solution strengthening effect, or, above an appropriate level, improves surface properties of hot-dip galvanized steel sheets.

In the present disclosure, the Si content is limited to 0.3% or less (excluding 0%) for obtaining sufficient strength and improving elongation. Even without the addition of Si, there is no significant problem in terms of properties. However, 0% is excluded in consideration of being inevitably added during manufacturing. When the Si content is more than 0.3%, surface properties of plated steel sheets are deteriorated, and there is almost no effect in forming a multi-phase steel.

P: 0.1% or less (excluding 0%)

Phosphorous (P) in steel is the most beneficial element in obtaining sufficient strength without significantly deteriorating formability. However, it is problematic in that when P is excessively added, the possibility of brittle fracture significantly increases, thereby increasing the possibility of plate rupture during slab hot rolling, and P acts as an element that deteriorates surface properties of plated steel sheets.

Therefore, in the present disclosure, the P content is limited to 0.1%, excluding 0% in consideration of being inevitably added.

S: 0.01% or less (excluding 0%)

Sulfur (S) is an impurity element inevitably added in steel, and it is important to control the S content to be as low as possible. Particularly, since S in steel increases the possibility of red shortness, it is preferable that the S content is controlled to be 0.01% or less. However, 0% is excluded in consideration of being inevitably added during manufacturing.

N: 0.01% or less (excluding 0%)

Nitrogen (N) is an impurity element inevitably added in steel. Although it is important to control the N content to be as low as possible, steel refining costs dramatically increase to this end. Therefore, it is preferable that the N content is controlled to be 0.01% or less in which operating conditions are feasible. However, 0% is excluded in consideration of being inevitably added during manufacturing.

sol. Al: 0.02-0.06%

Acid-soluble aluminum (sol. Al) is an element that is added for grain refinement and deoxidation in steel. When the sol. Al content is less than 0.02%, Al-killed steel cannot be produced in a conventional stable state. Conversely, when the sol. Al content is more than 0.06%, it is advantageous in terms of strength improvement, but excess amounts of inclusions are formed during continuous casting in steelmaking, thereby increasing the possibility of surface defects in hot-dip galvanized steel sheets and causing an increase in manufacturing costs. Therefore, in the present disclosure, it is preferable that the sol. Al content is controlled to be 0.02-0.06%.

Mo: 0.2% or less (excluding 0%)

Molybdenum (Mo) is an element that is added to delay transformation of austenite into pearlite and to accomplish refinement of ferrite and strength improvement. Mo improves hardenability of steel and allows for forming fine martensite in grain boundaries, and is thus capable of controlling the yield ratio. However, as an expensive element, the higher content is unfavorable in manufacturing. Therefore, it is preferable that the Mo content is appropriately controlled.

In order to obtain the above-described effects, it is preferable that Mn is added up to 0.2%. A Mn content of more than 0.2% leads to a sharp increase in alloy costs, thereby reducing economical efficiency rather than reducing ductility of steel. Although, in the present disclosure, the optimum content of Mo is 0.05%, there is no difficulty in obtaining desired properties even without essential addition. However, 0% is excluded in consideration of being inevitably added during manufacturing.

B: 0.003% or less (excluding 0%)

Boron (B) in steel is an element that is added to prevent secondary working brittleness caused by the addition of P. A B content of more than 0.003% leads to a decrease in elongation. Therefore, the B content is controlled to be 0.003% or less, excluding 0% in consideration of being inevitably added.

The steel sheet according to the present disclosure may contain a remainder of Fe and other inevitable impurities, in addition to the aforementioned components.

In the hot-dip galvanized steel sheet and the hot-dip galvannealed steel sheet, which satisfy the above-described compositions, according to the present disclosure, it is preferable that the base steel sheet has a microstructure including ferrite as a primary phase, and a remainder of martensite. In this case, some of the microstructure may include bainite, and it is preferable that the amount of bainite is, if possible, minimized, or that bainite is absent.

Therefore, it is preferable that the base steel sheet of the hot-dip galvanized steel sheet according to the present disclosure has a microstructure including, in area %, 90% or more of ferrite, and a remainder of martensite and 3% or less of bainite (B), as defined by Equation 1.

It is preferable that, at ¼t based on the total thickness (t) of the base steel sheet, a ferrite fraction is 90% or more, and the fraction of the dual-phase structure including the remainder of martensite and bainite is 1-10%. When the fraction of the dual-phase structure is less than 1%, it is difficult to form a multi-phase steel, and thus difficult to obtain a steel sheet having a low yield ratio. Conversely, when the fraction of the dual-phase structure is more than 10%, the strength becomes too high to obtain desired workability. According to experimental results of the present inventors, a more preferable fraction of a martensite structure is 2-5% at ¼t based on the thickness of the base steel sheet. This is the optimum condition for obtaining an excellent low yield ratio and sufficient ductility by controlling the optimum content of fine martensite. Furthermore, as shown in Equation 1 below, although bainite may be absent, 3% or less of bainite is preferable when bainite is inevitably formed. When the bainite content is more than 3%, C concentration around bainite increases, thus deteriorating ductility and increasing the yield ratio, thereby being inappropriate for the present disclosure.

$$B (\%) = \{BA/(MA+BA)\} \times 100 \quad \text{[Equation 1]}$$

where BA is the area occupied by bainite, and MA is the area occupied by martensite.

In the present disclosure, it is important that the area ratio of bainite in the entire dual-phase structure is controlled to be low. This is because, in the case of bainite compared to martensite, solute atoms in bainite grains, i.e., C and N, are easily trapped in dislocations, resulting in an impediment of dislocation movement and discontinuous yielding behavior, thereby significantly increasing the yield ratio.

Therefore, when the area ratio of bainite in the entire dual-phase structure is 3% or less, the yield ratio prior to skin pass rolling may be controlled to be 0.57 or less, and the yield ratio may be controlled at an appropriate level by subsequent skin pass rolling. When the area ratio of bainite is higher than 3%, the yield ratio prior to skin pass rolling is higher than 0.57, so that it is difficult to manufacture a multi-phase steel sheet having a low yield ratio, and thus causing a decrease in ductility.

Furthermore, in the hot-dip galvanized steel sheet and the hot-dip galvannealed steel sheet according to the present disclosure, it is preferable that the ratio (M %) occupied by martensite having an average particle diameter of 5 μm or less in ferrite grain boundaries (including grain boundary triple points), which is defined by Equation 2 below, is 90% or higher. That is, when the fine martensite having an average particle diameter of 5 μm or less exists mainly in ferrite grain boundaries compared to within ferrite grains, it is advantageous in improving ductility while a low yield ratio is being maintained.

$$M (\%) = \{M_{gb}/(M_{gb}+M_{in})\} \times 100 \quad \text{[Equation 2]}$$

where $M_{gb}$ is the amount of martensite in ferrite grain boundaries, and $M_{in}$ is the amount of martensite within ferrite grains, the martensite having an average particle diameter of 5 μm or less.

Thus, when the ratio occupied by martensite in ferrite grain boundaries is 90% or higher, the yield ratio prior to skin pass rolling may be controlled to be 0.55 or less, and the yield ratio may be controlled at an appropriate level by subsequent skin pass rolling. When the ratio occupied by martensite is less than 90%, martensite formed within grains increases yield strength during tensile strain, so that the yield ratio increases and cannot be controlled through skin pass rolling. In addition, elongation decreases because martensite within grains significantly impedes dislocation movement during formation, thereby weakening ductility and thus causing a decrease in elongation. Also, elongation decreases because a large amount of martensite is formed within ferrite grains, thereby generating too many dislocations, and thus impeding the movement of mobile dislocations during forming. The present disclosure is devised so as to maximize F content and thus achieve ductility.

Furthermore, in the hot-dip galvanized steel sheet and the hot-dip galvannealed steel sheet according to the present disclosure, it is preferable that at ¼t based on the thickness of the base steel sheet, the ratio of a C concentration (a) in the ferrite phase to a C concentration (b) in the martensite phase, i.e., (a)/(b), is 0.7 or less, and the ratio of an Mn concentration (c) in the ferrite phase to an Mn concentration (d) in the martensite phase, i.e., (c)/(d), is 0.8 or less.

These features are very important in the present disclosure, and the technical significance thereof is that a multi-phase steel having excellent ductility is provided even in the same ferrite content by controlling concentration ratios of C and Mn in ferrite and martensite in a matrix structure, such that concentration ratios of C and Mn in ferrite are controlled to be as low as possible as compared to martensite. At ¼t based on the thickness of the base steel sheet, when the ratio of a C concentration (a) in the ferrite phase to a C concentration (b) in the martensite phase, i.e., (a)/(b), is 0.7 or less and the Mn concentration ratio is less than 0.8, the softening property of ferrite is improved, and better ductility may be obtained. However, when the C concentration ratio is higher than 0.7 or the Mn concentration ratio is higher than 0.8, there is almost no difference in C and Mn concentration ratios between martensite and ferrite, so that it is not possible to obtain required ductility. This may be developed by component designs and characterization of operating conditions.

Meanwhile, in the hot-dip galvanized steel sheet and the hot-dip galvannealed steel sheet according to the present disclosure, it is preferable that, in the base steel sheet, the ferrite phase has an average grain size of 4 μm or greater, and the area occupied by the ferrite phase having an average grain size of 7 μm or greater in the entire ferrite phase is controlled to be 10% or higher. When the ferrite phase has the larger grain size and more uniform grains, it is possible to manufacture a steel sheet having excellent ductility. When the average grain size is less than 4 μm, it is not possible to obtain the required ductility. Also, when the area occupied by the ferrite phase having an average grain size of 7 μm or greater in the entire ferrite phase is less than 10%, ferrite grain coarsening cannot be performed, thereby being problematic in obtaining sufficient ductility.

Next, the method for manufacturing a hot-dip galvanized steel sheet and a hot-dip galvannealed steel sheet having excellent elongation properties according to the present disclosure will be described in detail.

First, in the present disclosure, a steel slab having compositional components as described above is prepared and then reheated. Such a reheating step is performed in order to perform a subsequent hot-rolling step without a hitch, and to fully obtain the desired properties of a steel sheet. The present disclosure is not particularly limited to such reheating conditions, but general conditions may be employed. As an example, the reheating step may be performed in in a temperature range of 1100-1300° C.

Subsequently, in the present disclosure, the reheated steel slab is subjected to finish hot-rolling in a temperature range of Ar3+50° C.-950° C. In the present disclosure, it is preferable that the reheated steel slab is subjected to finish hot-rolling in a temperature range of Ar3+50° C.-950° C. which is defined by Equation 3 below. Fundamentally, it is advantageous to perform the finish hot-rolling in an austenitic single phase region. This is because more uniform deformation is applied to a structure basically composed of single phase grains, and homogeneity in the structure may thus be increased. When the finish hot-rolling temperature is below Ar3+50° C., rolling is highly likely to be performed in a ferrite+austenite dual-phase region, thereby causing poor material homogeneity. Conversely, when the finish hot-rolling temperature is above 950° C., during cooling after hot-rolling, coil warping may occur due to material inhomogeneity caused by the formation of abnormal coarse grains.

$$Ar3=910-310*C-80*Mn-20*Cu-15*Cr-55*Ni-80*Mo \quad \text{[Equation 3]}$$

where Ar3 is a theoretical temperature.

Then, in the present disclosure, the finish hot-rolled sheet is coiled at 450-700° C. When the coiling temperature is lower than 450° C., an excess amount of martensite or bainite is formed, thus causing an excessive increase in strength, so that problems such as shape defects may be caused by a load during subsequent cold-rolling. Conversely, when the coiling temperature is above 700° C., there is a problem of severe surface enrichment of elements such Si, Mn, and B in steel, which reduce hot-dip galvanizing wettability. Therefore, it is preferable that the coiling temperature is controlled to be 450-700° C. in consideration of these problems. Then, the coiled hot-rolled sheet may be subjected to pickling under general conditions.

Subsequently, in the present disclosure, the coiled hot-rolled steel sheet is subjected to cold-rolling with a reduction ratio of 40-80%. It is preferable that the cold-rolling is performed with a reduction ratio of 40-80%. When the cold-rolling reduction ratio is less than 40%, it is difficult to obtain a desired thickness and straighten the steel sheet. Conversely, when the cold-rolling reduction ratio is greater than 80%, it is highly likely that cracks are generated at the edge of the steel sheet, which may result in an overload on cold-rolling.

Subsequently, the cold-rolled steel sheet prepared according to the above steps is preferably subjected to continuous annealing in a temperature range of 760-850° C. The continuous annealing is performed in a continuous galvannealing furnace.

The purpose of the continuous annealing step is to perform recrystallization, form ferrite and austenite recrystallization, and distribute carbon. When the continuous annealing temperature is below 760° C., full recrystallization is not achieved, and it is difficult to sufficiently form austenite, so that it becomes difficult to obtain the strength intended in the present disclosure. Conversely, when the continuous annealing temperature is above 850° C., it is problematic in that productivity decreases, and austenite is excessively formed, thus reducing ductility due to bainite after cooling. Therefore, it is preferable that the continuous annealing temperature range is controlled to be 760-850° C. in consideration of these problems. More preferably, the continuous annealing is performed in a temperature range of 770-810° C.

Although these temperature ranges correspond to dual-phase regions (ferrite+austenite), it is preferable that the continuous annealing is performed at a temperature in which ferrite regions are included as much as possible. The higher amount of initial ferrite at an annealing temperature in dual-phase regions allows for facilitating grain growth after annealing, thus improving ductility. Lowering a martensite start temperature (Ms) with an increase in the degree of C enrichment in austenite enables the formation of martensite during final cooling after subsequent hot-dip galvanizing in a pot, and fine and uniform martensite is thus largely distributed in grains, thereby being capable of the manufacturing of a steel sheet having excellent ductility and low yield ratio. The lower the secondary heating temperature range, the more favorably C in ferrite diffuses into austenite (higher degree of C saturation in austenite than ferrite), and the higher content of austenite having a higher degree of C enrichment facilitates the formation of fine martensite, thereby being capable of the manufacturing of a steel sheet having high ductility.

Furthermore, in the present disclosure, the continuous annealed steel sheet is subjected to a first cooling at an average cooling rate of 2-8° C./s. In the present disclosure, the higher first cooling temperature and the lower first cooling rate allow for more uniform ferrite and a higher coarsening tendency, thus being advantageous in terms of ductility. Furthermore, during the first cooling, enough time is given for C, albeit a small amount, to diffuse into austenite. This has an important significance in the present disclosure. In more detail, in a dual-phase region, C always dynamically diffuses into austenite, generally, having high degree of C enrichment, and diffusion velocity increases with increases in temperature and time. Therefore, the first cooling temperature is important. When the first cooling temperature is below 630° C., which is too low of a temperature, diffusion activity of C is too low to sufficiently diffuse into austenite, and C concentration in ferrite thus increases. Therefore, in a final material, a C concentration gradient between ferrite and martensite phases becomes 0.7 or higher, or a Mn concentration gradient therebetween becomes 0.8 or higher, thus being disadvantageous in terms of ductility. That is, the present disclosure is characterized in that C and Mn concentration ratios in ferrite are controlled to be as low as possible in order to facilitate ferrite softening and thus manufacture steel having excellent ductility. Conversely, when the first cooling temperature is above 670° C., it is advantageous in terms of the aforementioned characteristics, but is problematic in that an overly rapid cooling rate may be required during cooling.

Also, it is preferable that the first cooling rate is limited to 2-8° C./s. This is because when the first cooling rate is less than 2° C./s, it is problematic in terms of productivity due to an overly low cooling rate, and when the first cooling rate is higher than 8° C./s, there is insufficient time for C to diffuse into austenite.

Subsequently, in the present disclosure, the first cooled steel sheet is subjected to a second cooling to a temperature range of Ms+20° C.-Ms+50° C. at an average cooling rate of 3-10° C./s. Here, Ms may be defined by Equation 4 below.

$$Ms \; (° C.)=539-423C-30.4Mn-12.1Cr-17.7Ni-7.5Mo \quad \text{[Equation 4]}$$

where Ms is a theoretical temperature for forming a M phase.

According to the present disclosure, when the martensite phase is formed before passing through 440-480° C., which is a temperature range in general hot-dip galvanizing pots, finally, the martensite phase is prone to coarsening, and it is not possible to obtain a low yield ratio. Therefore, in the present disclosure, the second cooling temperature range is limited to Ms+20° C.-Ms+50° C., and it is required that the second cooling rate is as low as possible in this temperature condition to suppress the formation of the martensite phase. When the second cooling temperature is below Ms+20° C., a martensite phase may be formed. Conversely, when the second cooling temperature is above Ms+50° C., a subsequent cooling rate becomes rather high, and the martensite phase is highly likely to form before subsequent dipping into the pot.

Meanwhile, it is preferable that the second cooling rate is limited to 3-10° C./s. This is because when the second cooling rate is less than 3° C./s, the martensite phase is not formed, but is problematic in terms of productivity, and when the second cooling rate is higher than 10° C./s, threading speed increases as a whole, and problems such as warping in a plate shape may thus be caused.

Subsequently, in the present disclosure, the second cooled steel sheet is subjected to a hot-dip galvanizing treatment in a temperature range of 440-480° C., and thereafter, is cooled to a temperature of Ms−100° C. or lower at an average cooling rate of 4° C./s or higher.

In the present disclosure, the hot-dip galvanizing treatment may be performed by dipping the second cooled steel sheet into the pot in a general temperature range of 440-480° C. Although the present disclosure is not limited to these specific hot-dip galvanizing conditions, it is preferable that the average cooling rate, with which the second cooled steel sheet is cooled to a pot temperature in the above temperature range, is set to be 4-8° C./s. By controlling the average cooling rate to be 4-8° C./s, it is possible that a martensite structure in the steel sheet is not formed before the steel sheet reaches the pot. Specifically, when the cooling rate is lower than 4° C./s, martensite is not formed, but is inappropriate due to poor productivity. Conversely, when the cooling rate is higher than 8° C./s, some martensite and bainite are formed within grains, thus increasing yield strength and deteriorating ductility.

Subsequently, in the present disclosure, the hot-dip galvanized steel sheet is cooled to a temperature of Ms−100° C. or lower at an average cooling rate of 4° C./s or higher, so that a hot-dip galvanized steel sheet having fine martensite may be manufactured in the final step. In temperature conditions above Ms−100° C., fine martensite phases cannot be obtained unless the cooling rate is very high, and shape defects in the sheet may occur.

Therefore, in the present disclosure, the hot-dip galvanized steel sheet is cooled to a temperature of Ms−100° C. or lower at an average cooling rate of 4° C./s or higher. When the cooling rate is less than 4° C./s, due to an overly low cooling rate, martensite is irregularly formed in grain boundaries or within grains, and the formation ratio of inter-granular martensite to intra-granular martensite is too low, so that steel having a low yield ratio cannot be manufactured and productivity is also deteriorated.

Meanwhile, in the present disclosure, the above-described hot-dip galvanized steel sheet may be subjected to a subsequent reheating treatment at a general heat treating temperature, and then finally cooled to a temperature of Ms−100° C. or lower at an average cooling rate of 4° C./s or higher to manufacture a hot-dip galvannealed steel sheet. Other conditions are the same as in the case of the above-described hot-dip galvanized steel sheet.

Hereinafter, the present disclosure will be described in detail by way of example.

Steel slabs having compositional components shown in Table 1 below were prepared, and thereafter, hot-dip galvanized steel sheets were manufactured using manufacturing processes as shown in Table 2 below. In Table 1 below, inventive steels 1-2 and 4-5 were used to manufacture hot-dip galvannealed steel sheets (GA), and inventive steels 3 and 6 were used to manufacture hot-dip galvanized steel sheets (GA).

Properties of hot-dip galvanized steel sheets manufactured as above were evaluated, and the results are shown in Table 3 below. The present disclosure aims to manufacture a steel sheet having a yield ratio of 0.57 or less and a hole expansion ratio (HER) of 80% or higher in a state without skin pass rolling.

A tensile test for each specimen was performed in the C direction using the JIS standard, a matrix structure was analyzed at ¼t based the thickness of an annealed steel sheet, and microstructural fractions were obtained using the results. Specifically, the area ratios of martensite and bainite were first calculated using an optical microscope through Lepelar etching, and then the fractions thereof were accurately measured through a Count Point operation after observation using a SEM (magnification: ×3,000)

Meanwhile, in order to obtain C and Mn concentration ratios in ferrite and martensite in the matrix structure of a base steel sheet, a sputtering cut was performed from the surface of a plated layer to ¼t inside the base steel without structural damage using a Focus Ion Beam (FIB) system. Subsequently, the concentration ratios of C and Mn in each phase were quantitatively evaluated by Line and Point scanning in Energy Dispersive Spectroscopy (EDS) analysis using TEM.

Steels having compositions shown in Table 1 below were prepared under the conditions shown in Table 2 below, and thereafter, properties thereof were confirmed. As desired material properties in the present disclosure, the target is to obtain a yield ratio of 0.57 or less and a hole expansion ratio (HER) of 80% or higher in a state without skin pass rolling.

A tensile test for each specimen was performed in the C direction using the JIS standard, and microstructural fractions were obtained at ¼t based on the thickness of an annealed steel sheet using an optical microscope. M and B phases were observed through Lepelar etching. The area ratios of martensite and bainite were first calculated using an optical microscope through Lepelar etching, and then the fractions thereof were accurately measured through a Count Point operation after observation using a SEM (magnification: ×3,000).

In order to obtain C and Mn concentration ratios in ferrite and martensite in the structure, a sputtering cut was performed from the surface of a plated layer to ¼t inside the base steel without structural damage using a Focus Ion Beam (FIB) system. A 10 mm hole was created in the specimen by milling, the specimen was then pushed up from the bottom using a cone-type punch until surface cracking was initiated, and the hole expansion ratio was obtained by calculating the initial hole diameter ratio before the cracking.

In Table 3 below, the yield ratio (7) is a value measured before skin pass rolling.

TABLE 1

| | Composition (wt %) | | | | | | | | | |
|---|---|---|---|---|---|---|---|---|---|---|
| Item | C | Mn | Si | Cr | P | S | N | sol. Al | Mo | B |
| Inventive Steel 1 | 0.023 | 1.75 | 0.05 | 0.81 | 0.06 | 0.006 | 0.003 | 0.03 | 0.15 | 0.0006 |
| Inventive Steel 2 | 0.041 | 1.72 | 0.04 | 0.48 | 0.05 | 0.005 | 0.003 | 0.04 | 0.12 | 0.0009 |
| Inventive Steel 3 | 0.053 | 1.55 | 0.11 | 0.42 | 0.03 | 0.007 | 0.004 | 0.05 | 0.13 | 0.0015 |
| Inventive Steel 4 | 0.056 | 1.56 | 0.16 | 0.83 | 0.04 | 0.004 | 0.003 | 0.041 | 0.15 | 0.0021 |
| Inventive Steel 5 | 0.068 | 1.48 | 0.21 | 0.87 | 0.02 | 0.003 | 0.005 | 0.052 | 0.18 | 0.0008 |
| Inventive Steel 6 | 0.076 | 1.38 | 0.25 | 0.08 | 0.03 | 0.004 | 0.008 | 0.025 | 0.08 | 0.0012 |
| Comparative Steel 1 | 0.095 | 1.22 | 0.6 | 1.16 | 0.13 | 0.006 | 0.003 | 0.04 | 0.45 | 0.004 |
| Comparative Steel 2 | 0.091 | 1.26 | 0.8 | 1.21 | 0.12 | 0.007 | 0.005 | 0.05 | 0.38 | 0.0041 |

TABLE 2

| | Manufacturing Process Conditions | | | | | | | | | |
|---|---|---|---|---|---|---|---|---|---|---|
| Item | Reheating Temperature (SRT ° C.) | Finish Rolling Temperature (FT ° C.) | Coiling Temperature (° C.) | Cold-rolling Reduction Ratio (%) | Annealing Temperature (° C.) | First Cooling Rate (° C./s) | Second Cooling Rate (° C./s) | Pot Cooling Rate (° C./s) | Final Cooling Rate (° C./s) | Remarks |
| Inventive Steel 1 | 1182 | 882 | 580 | 46 | 768 | 2.5 | 4.2 | 4.5 | 4.5 | Example 1 |
| | 1186 | 895 | 556 | 52 | 769 | 2.8 | 4.5 | 4.6. | 5.7 | Example 2 |
| Inventive Steel 2 | 1189 | 912 | 465 | 63 | 775 | 3.5 | 3.8 | 5.1 | 6.2 | Example 3 |
| | 1186 | 921 | 472 | 65 | 779 | 3.6 | 3.5 | 5.5 | 6.3 | Example 4 |
| Inventive Steel 3 | 1201 | 891 | 682 | 71 | 810 | 4.8 | 6.3 | 6.3 | 9.2 | Example 5 |
| | 1203 | 896 | 678 | 72 | 815 | 4.9 | 6.2 | 6.2 | 9.6 | Example 6 |
| Inventive Steel 4 | 1195 | 935 | 580 | 78 | 751 | 5.6 | 8.1 | 7.8 | 5.3 | Comparative Example 1 |
| | 1196 | 942 | 585 | 79 | 821 | 5.8 | 8.6 | 7.5 | 7.8 | Example 7 |
| Inventive Steel 5 | 1186 | 928 | 630 | 69 | 855 | 6.8 | 9.4 | 9.2 | 10.2 | Comparative Example 2 |
| | 1189 | 912 | 632 | 65 | 839 | 6.2 | 12.1 | 10.8 | 9.2 | Comparative Example 3 |
| Inventive Steel 6 | 1210 | 897 | 682 | 38 | 841 | 7.5 | 8.5 | 9.2 | 5.2 | Comparative Example 4 |
| | 1206 | 888 | 675 | 68 | 836 | 9.8 | 7.8 | 9.5 | 8.9 | Comparative Example 5 |
| Comparative Steel 1 | 1203 | 897 | 660 | 72 | 802 | 2.8 | 6.5 | 11.5 | 5.3 | Comparative Example 6 |
| Comparative Steel 2 | 1196 | 892 | 672 | 75 | 803 | 3.5 | 6.5 | 6.8 | 5.2 | Comparative Example 7 |
| | 1187 | 885 | 683 | 78 | 779 | 4.1 | 7.8 | 8.3 | 3.8 | Comparative Example 8 |

TABLE 3

| Item | ① M Fraction (%) | ② B Fraction (%) | ③ M Ratio (%) | ④ (a/b) | ⑤ (c/d) | ⑥ F Ratio (%) | ⑦ Yield Ratio | Elongation (%) | TS (MPa) | Remarks |
|---|---|---|---|---|---|---|---|---|---|---|
| Inventive Steel 1 | 2.5 | 1.5 | 92 | 0.65 | 0.71 | 12 | 0.57 | 37 | 475 | Example 1 |
| | 1.8 | 1.7 | 91.5 | 0.63 | 0.69 | 13 | 0.56 | 38 | 468 | Example 2 |
| Inventive Steel 2 | 3.5 | 0.7 | 90.6 | 0.58 | 0.65 | 12 | 0.57 | 36 | 509 | Example 3 |
| | 3.4 | 0.5 | 92.1 | 0.59 | 0.59 | 11 | 0.56 | 35 | 508 | Example 4 |

TABLE 3-continued

| Item | ① M Fraction (%) | ② B Fraction (%) | ③ M Ratio (%) | ④ (a/b) | ⑤ (c/d) | ⑥ F Ratio (%) | ⑦ Yield Ratio | Elongation (%) | TS (MPa) | Remarks |
|---|---|---|---|---|---|---|---|---|---|---|
| Inventive Steel 3 | 4.2 | 0.3 | 92.3 | 0.62 | 0.63 | 12 | 0.57 | 33 | 518 | Example 5 |
|  | 5.1 | 0.1 | 91.5 | 0.63 | 0.75 | 14 | 0.57 | 33 | 513 | Example 6 |
| Inventive Steel 4 | 1.8 | 3.5 | 88 | 0.75 | 0.83 | 13 | 0.63 | 23 | 612 | Comparative Example 1 |
|  | 6.8 | 2.1 | 90.5 | 0.58 | 0.71 | 12 | 0.57 | 30 | 632 | Example 7 |
| Inventive Steel 5 | 3.1 | 0.3 | 87 | 0.55 | 0.63 | 8.2 | 0.65 | 25 | 532 | Comparative Example 2 |
|  | 10.2 | 1.2 | 78 | 0.75 | 0.83 | 6.8 | 0.56 | 28 | 535 | Comparative Example 3 |
| Inventive Steel 6 | 1.8 | 0.5 | 93 | 0.72 | 0.82 | 7.8 | 0.65 | 32 | 532 | Comparative Example 4 |
|  | 9.8 | 1.5 | 76 | 0.71 | 0.83 | 8.1 | 0.56 | 26 | 532 | Comparative Example 5 |
| Comparative Steel 1 | 4.1 | 3.5 | 77 | 0.77 | 0.82 | 7.5 | 0.72 | 26 | 554 | Comparative Example 6 |
| Comparative Steel 2 | 4.3 | 3.2 | 81 | 0.75 | 0.83 | 7.2 | 0.71 | 25 | 555 | Comparative Example 7 |
|  | 4.2 | 3.3 | 83 | 0.74 | 0.83 | 7.9 | 0.68 | 26 | 541 | Comparative Example 8 |

In Table 3,

① is the fraction of martensite (M) in a structure (%),

② is the fraction of bainite (B) in a structure (%),

③ is the ratio occupied by martensite (M) having an average particle diameter of 5 μm or less in ferrite grain boundaries (including grain boundary triple points) (%), ④ is the ratio (a/b) of a C concentration (a) in the ferrite phase to a C concentration (b) in the martensite phase, at ¼t based on the thickness (t) of a base steel sheet, ⑤ is the ratio (c/d) of an Mn concentration (c) in the ferrite phase to an Mn concentration (d) in the martensite phase, at ¼t based on the thickness (t) of a base steel sheet, ⑥ is the ratio occupied by ferrite grains having an average grain size of 7 μm or greater in the ferrite phase on the basis of the entire area, and ⑦ is a yield ratio (YS/TS).

As shown in Tables 1 and 2, it can be seen that Inventive Examples 1-7, which satisfy both steel compositions and manufacturing conditions suggested in the present disclosure, exhibit tensile strengths of 450-650 MPa and yield ratios of 0.57 or less, and hole expansion ratios of 80% or higher are obtained within a tensile strength range of the present disclosure.

FIG. 1 shows C and Mn concentration ratios within a depth of 10 μm from the surface layer of base steel and at ¼t of the total thickness, which were analyzed with a Count Point Sec (CPS) method by Line analysis using TEM. It can be seen that C and Mn concentration ratios are significantly decreased at the surface layer compared to a ¼t point.

Figure 2:
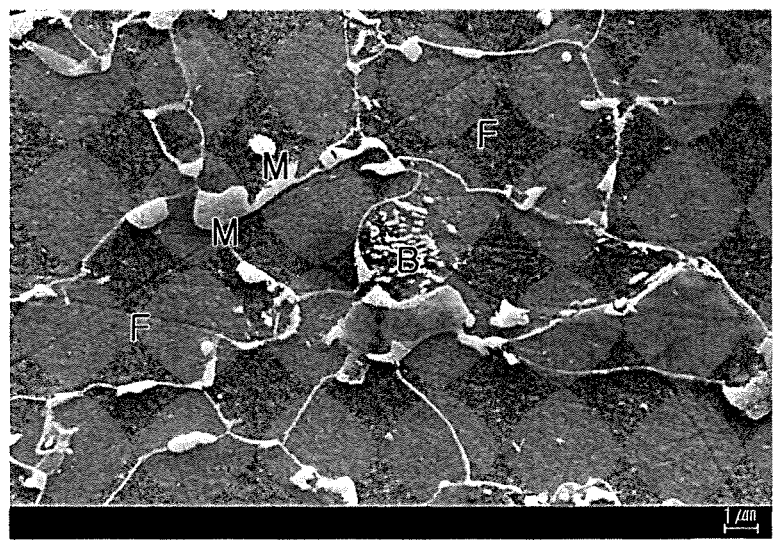
FIG. 2 is an image showing a result of microstructural observation at ¼t based on the thickness (t) of the base steel sheet in FIG. 1.

FIG. 2 shows microstructural observation of a surface layer considered within a depth of 10 μm including the surface layer of base steel and a central portion using a SEM, and it can be seen that ferrite in the surface layer is coarse, and particularly, inter-granular martensite phases are significantly reduced.

Conversely, in the case where steel compositions fall within a range of the present disclosure but manufacturing conditions are out of range of the present disclosure (Comparative Examples 1-5), or where steel compositions are out of range of the present disclosure (Comparative Examples 6-8), C and Mn concentration ratios in the surface layer of base steel were higher than those at ¼t, or C and Mn concentration ratios in the martensite phase in the surface layer were higher than those at ¼t. Therefore, softening in the surface layer of a base steel sheet is hardly expected, and desired mechanical properties in the present disclosure could not be obtained. In the case of these steels, it is expected to result in greater potential defects such as rupture during formation.

Specifically, in the case of Comparative Example 1 in Inventive Steel 4, the annealing temperature is low, and the fraction of austenite is thus lowered in a dual-phase temperature region. Therefore, in the final structure, the fraction of martensite was lowered, and the yield ratio was thus increased, so that there was a problem in that elongation finally decreased.

In the case of Comparative Example 2 in inventive steel 5, the annealing temperature was too high, and the ratio (%) occupied by the martensite (M) phase having an average particle diameter of 5 μm or less in ferrite grain boundaries (including triple points) was thus lowered, resulting in a decrease in elongation. Thus, Comparative Example 2 in Inventive Steel 5 was inappropriate for the present disclosure.

Comparative Steels 1 and 2 fail to satisfy the composition range of the present disclosure despite Cr addition for improving hardenability. Therefore, the ratio (%) occupied by the martensite phase in ferrite grain boundaries (including triple points) was lowered, and elongation was eventually inadequate compared to the target.

As set forth above, according to exemplary embodiments of the present disclosure, it is possible to provide a hot-dip galvanized steel sheet and a hot-dip galvannealed steel sheet, which are capable of obtaining excellent strength and ductility properties, and which are suitable for automotive body panels requiring high workability.

While exemplary embodiments have been shown and described above, it will be apparent to those skilled in the art that modifications and variations could be made without departing from the scope of the present invention as defined by the appended claims.

What is claimed is:

1. A method for manufacturing a hot-dip galvanized steel sheet having excellent elongation properties in which a hot-dip galvanized layer is formed on a surface of a base steel sheet, the method comprising:

preparing a steel slab and thereafter reheating the steel slab, the steel slab comprising, 0.02-0.08% of carbon (C), 1.3-2.1% of manganese (Mn), 0.3% or less of silicon (Si) (excluding 0%), 1.0% or less of chromium (Cr) (excluding 0%), 0.1% or less of phosphorous (P) (excluding 0%), 0.01% or less of sulfur (S) (excluding 0%), 0.01% or less of nitrogen (N) (excluding 0%), 0.02-0.06% of aluminum (sol, Al), 0.2% or less of molybdenum (Mo) (excluding 0%), 0.003% or less of boron (B) (excluding 0%), and a remainder of Fe and other inevitable impurities, in wt %;

performing finish hot-rolling on the reheated steel slab in a temperature range of Ar3+50° C.-950° C., and thereafter coiling the finish hot-rolled steel sheet at 450-700° C.;

performing cold-rolling on the coiled hot-rolled steel sheet with a reduction ratio of 40-80%, and thereafter performing continuous annealing on the cold-rolled steel sheet in a temperature range of 760-850° C.;

performing a first cooling on the continuous annealed steel sheet to a temperature range of 630-670° C. at an average cooling rate of 2-8° C./s, and thereafter performing a second cooling on the first cooled steel sheet to a temperature range of Ms+20° C. to Ms+50° C. at an average cooling rate of 3-10° C./s, wherein Ms is martensite start temperature; and performing hot-dip galvanizing on the second cooled steel sheet in a temperature range of 440-480° C., and thereafter cooling the hot-dip galvanized steel sheet to a temperature of Ms−100° C. or lower at an average cooling rate of 4° C./s or higher.

2. The method of claim 1, wherein the base steel sheet of the hot-dip galvanized steel sheet, has a microstructure including 90% or more of ferrite, and a remainder of martensite and bainite, wherein B (%), as defined by Equation 1, is 3% or less;

contains a percentage of martensite (M %) having an average particle diameter of 5 μm or less occupying space in ferrite grain boundaries (including grain boundary triple points) of 90% or higher, as defined by Equation 2; and at ¼t based on the thickness (t) of the sheet, the ratio of a C concentration (a) in the ferrite phase to a C concentration (b) in the martensite phase, i.e., (a)/(b), is 0.7 or less, and the ratio of an Mn concentration (c) in the ferrite phase to an Mn concentration (d) in the martensite phase, i.e., (c)/(d), is 0.8 or less, $$B\ (\%) = \{BA/(MA+BA)\} \times 100 \quad \text{[Equation 1]}$$

where BA is the area occupied by bainite, and MA is the area occupied by martensite, $$M\ (\%) = \{M_{gb}/(M_{gb}+M_{in})\} \times 100 \quad \text{[Equation 2]}$$

where $M_{gb}$ is the amount of martensite in ferrite grain boundaries, and $M_{in}$ is the amount of martensite within ferrite grains, the martensite having an average particle diameter of 5 μm or less.

3. The method of claim 1, wherein, in the base steel sheet of the hot-dip galvanized steel sheet, the ferrite phase has an average grain size of 4 μm or greater, and the area occupied by the ferrite phase having an average grain size of 7 μm or greater in the entire ferrite phase is 10% or higher.

* * * * *